United States Patent [19]
Krimm

[11] Patent Number: 5,279,321
[45] Date of Patent: Jan. 18, 1994

[54] RUPTURE DISC

[75] Inventor: Alexander Krimm, Oberhausen, Fed. Rep. of Germany

[73] Assignee: Hoechst Aktiengesellschaft, Fed. Rep. of Germany

[21] Appl. No.: 985,803

[22] Filed: Dec. 2, 1992

[30] Foreign Application Priority Data

Dec. 5, 1991 [DE] Fed. Rep. of Germany ....... 4140089

[51] Int. Cl.$^5$ .............................. F16K 17/40
[52] U.S. Cl. .................. 137/68.1; 251/358; 220/207
[58] Field of Search ............. 137/68.1; 251/358; 220/207

[56] References Cited

U.S. PATENT DOCUMENTS

| 4,079,854 | 3/1978 | Shaw et al. | 137/68.1 X |
| 4,821,909 | 4/1989 | Hibler et al. | 220/207 |
| 5,155,471 | 10/1992 | Ellis et al. | 137/68.1 X |

FOREIGN PATENT DOCUMENTS

| 33867 | 8/1981 | European Pat. Off. | |
| 2121160 | 12/1972 | Fed. Rep. of Germany. | |
| 3142345 | 5/1983 | Fed. Rep. of Germany. | |
| 872063 | 7/1961 | United Kingdom. | |
| 1442286 | 11/1973 | United Kingdom | 137/68.1 |

Primary Examiner—John C. Fox
Attorney, Agent, or Firm—Jordan B. Bierman

[57] ABSTRACT

A rupture disc of a thermoplastic material in which metal wires or carbon fibers are imbedded. According to a particular embodiment of the invention, at least one of the wires is designed as an electrical conductor through which current flows.

10 Claims, 1 Drawing Sheet

RUPTURE DISC

This Application claims the benefit of the priority of German Application P 41 40 089.5, filed Dec. 5, 1991.

The invention relates to rupture discs, especially those for the protection of scientific and industrial hollow bodied apparatus, such as vessels, pipelines, and the like, against suddenly occurring, intolerable overpressure or underpressure. It is composed of a thermoplastic material, in which metal wires or carbon fibers are embedded for stabilization. The metal wires can, at the same time, signal the rupture of the membrane.

BACKGROUND OF THE INVENTION

Rupture discs have long proven their worth in industrial and scientific operations as safety devices. In comparison with safety valves, they have the advantage of responding virtually without inertia to pressure changes and being capable of opening large cross sections without delay.

There is a series of requirements for materials to be used to produce rupture discs. They must, in particular, have rupture values reliably reproducible, they must be easy to roll or otherwise form into sheets, and they should be corrosion resistant. Metals in the annealed, pure state and alloys are used to a great extent as such materials. Non-metals such as plastics, e.g. silicone rubber, are now increasingly being used for this purpose.

In practice it has been found that rupture discs do not always adequately withstand pulsating pressure loads. Such periodic pressure fluctuations occur, for example, if vessels are fed by piston engines. The rupture discs tend to vibrate, causing the disc material to display the effects of fatigue; in addition, the rupture values change after a period of greater or lesser duration.

Tests have been undertaken to counter the difficulties described. For instance, the relieving surfaces have been divided up, i.e. the rupture disc surfaces reduced and, to compensate for this, the number of relieving cross sections are correspondingly increased. Although this solution to the problem leads to success with regard to the mechanical stability of the rupture discs, it is technically complex and therefore not cost-effective.

SUMMARY OF THE INVENTION

Consequently, it is the object of the present invention to provide a rupture disc which, although flexible, is nevertheless stable, does not change its rupture value, and has a long service life. The object described above is achieved by a rupture disc of a thermoplastic material, wherein metal wires or carbon fibers, running parallel to the disc surface, are set.

The configuration of the rupture disc ensures that its strength is materially increased in comparison with a disc of plastic without integrated wires or fibers; moreover, vibrations such as those triggered by pressure fluctuations cannot lead to an impairment of its service life. It combines the advantages of metal and plastic.

The rupture disc according to the invention makes it possible not only to design large-dimensioned relieving surfaces, but also to match the disc to the most varied of surface area shapes by selection of suitable materials.

DETAILED DESCRIPTION OF THE INVENTION

Figure 1:
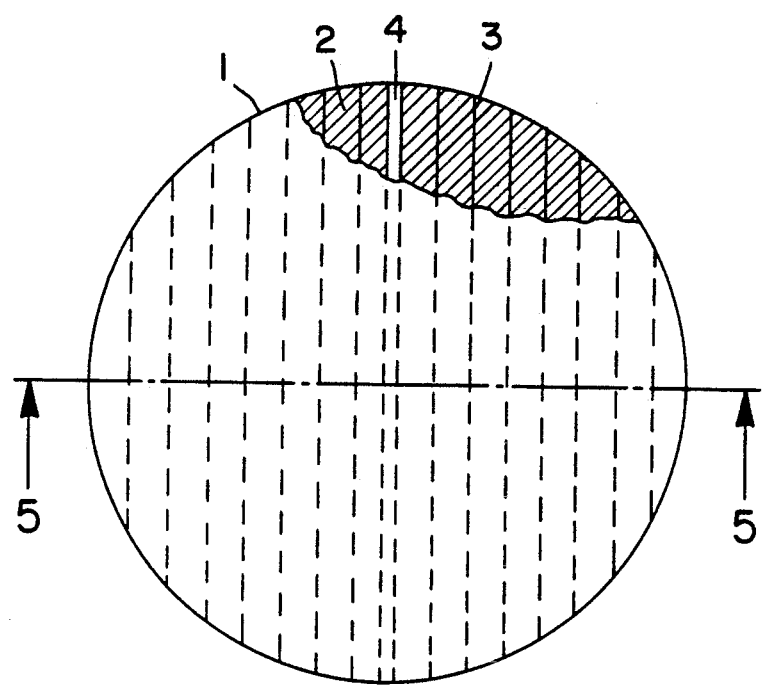

The thermoplastic materials usual for this field of application can be used as materials for the rupture disc according to the invention. It is, therefore, possible to adapt the rupture discs individually to the specific intended uses, e.g. the pressure and temperature conditions, the atmosphere acting on one or both sides, etc. By selection of certain materials, discs which are, for example, resistant to corrosive media or elevated temperatures are obtained. Instead of using resistant disc material, it is also possible for materials which are in fact unsuitable—or only conditionally suitable—to be provided with single-ply or multi-ply protective layers. For example, in the case of elevated temperatures, the protective layer may be designed as a heat-insulating layer. Examples of thermoplastic materials which are suitable for producing the novel rupture discs are polyethylenes, polypropylenes, polyamides, polyvinyls, polyacetates, polyesters, polytetrafluoroethylenes, and silicone rubbers. Polyethylenes, polyamides, and polytetrafluoroethylenes have proven particularly successful.

The thickness of the rupture disc depends on the specific application and is also governed by the material selected. Accordingly, it may be designed as a sheet or as a disc, there being no distinct differentiation between the two configurations.

The high stability of the rupture disc according to the invention is based on the integration of metal wires, carbon fibers, or the like in the plastic. Usually, they are arranged at certain intervals parallel to one another and to the disc surface, in such a way that they are surrounded on all sides by the thermoplastic material. Under these conditions, they produce particularly high stabilizing effects and are, moreover, protected against attack, for example by the action of corrosive substances. Allowance can be made for the respective demands on the rupture disc by the number of wires or fibers per unit area incorporated into the bursting membrane, by its thickness, and the particular material used. The most varied of elemental metals, such as iron, aluminum, copper, in special cases silver, as well as alloys, come into favorable consideration as wire materials; wires of copper and iron are particularly suitable.

In special cases, wire grids or wire meshes may be set in the thermoplastic material instead of a plurality of individual wires. Correspondingly, carbon fibers may also be used in their various textile forms—i.e. other than as fibers and yarns—for example, as woven fabrics and felts. In this way, properties and application possibilities of the rupture disc according to the invention can be additionally varied and extended.

According to a particular embodiment of the rupture disc according to the invention, at least one of the wires which is set therein is designed as an electrical conductor through which current flows. It is in connection with a suitable device and, on bursting open of the disc, sets off a signal by interrupting the current flow. It goes without saying that rupture discs containing carbon fibers can also be equipped with a conductor through which current flows as a signal generator.

Production of the novel rupture discs is carried out in the conventional way. Thus, two sheets of a thermoplastic material, between which the wires or fibers have been placed, can be welded over their entire surface area by heat treatment. Another method starts with the thermoplastics in powder form. In this case, the wires are imbedded in the powder, the powder is then pressed to form moldings, and subsequently sintered, if appropriate with the application of pressure.

The novel rupture disc can be used in pressure relieving devices of the conventional type, in particular those which are provided with a tear-open device. They are usually formed as a two-part frame, between portions of which the rupture disc is clamped in a suitable way, e.g. by screw bolts which are arranged at the periphery of the frame.

Figure 2:
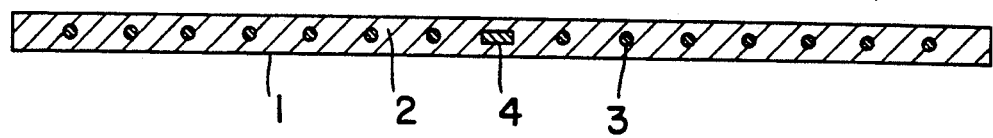

In the accompanying drawings, constituting a part hereof, and in which like reference characters indicate like parts, FIG. 1 shows a circular rupture disc in plan view; and
FIG. 2 is a cross section along line A-B of FIG. 1.

Disc 1 is made of the thermoplastic material 2, and has wires or fibers 3 embedded therein. Wires or fibers 3 provide strength and stability to material 2. Wire 4 is an electrical conductor which, when disc ruptures, triggers a signal based on interruption of the flow of current therethrough.

While only a limited number of specific embodiments of the present invention have been expressly disclosed, it is, nonetheless, to be broadly construed and not to be limited except by the character of the claims appended hereto.

I claim:

1. A rupture disc of thermoplastic material, having a plurality of metal wires or carbon fibers running parallel to a surface of said disc embedded in said thermoplastic material.

2. The disc of claim 1 wherein at least one of said wires is an electric conductor through which current flows.

3. The disc of claim 1 wherein said thermoplastic material is selected from the group consisting of polyethylenes, polypropylenes, polyamides, polyvinyls, polyacetates, polyesters, polytetrafluoroethylenes, silicone rubbers, and mixtures thereof.

4. The discs of claim 1 wherein said thermoplastic material is selected from the group consisting of polyethylenes, polyamides, polytetrafluoroethylenes, and mixtures thereof.

5. The disc of claim 1 wherein said metal wires are of a metal selected from the group consisting of iron, aluminum, copper, silver, and alloys thereof.

6. The disc of claim 1 wherein said metal wires are composed of copper or iron.

7. The disc of claim 1 wherein said metal wires are grid or mesh.

8. The disc of claim 1 wherein said carbon fibers are a woven fabric or felt.

9. The disc of claim 1 further comprising a plurality of layers.

10. The disc of claim 1 wherein said wires or fibers are parallel to each other.

* * * * *